Figure 1:
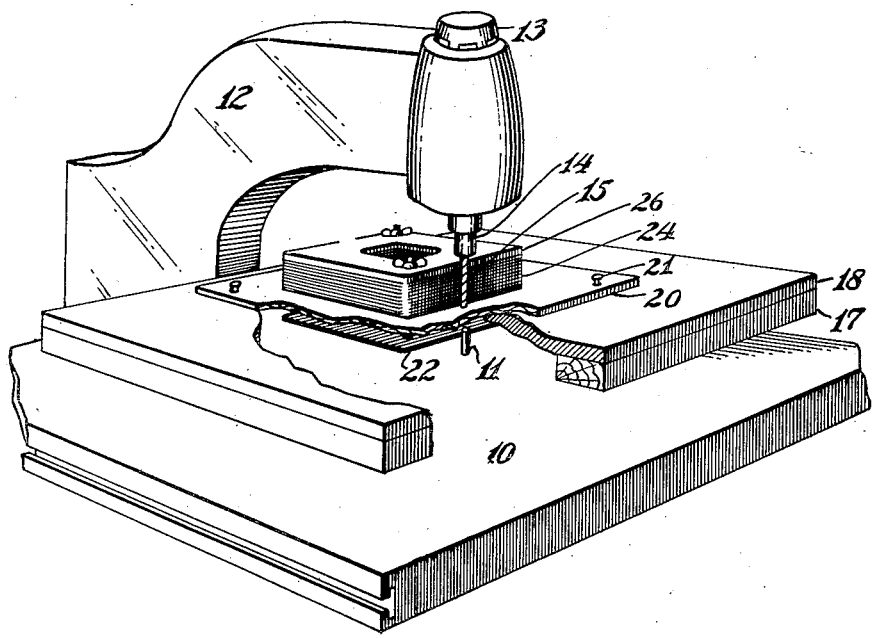

April 27, 1943.    D. JONES    2,317,616
ROUTING MACHINE FIXTURE
Filed Jan. 26, 1942

INVENTOR
*DEDGER JONES*
BY
ATTORNEY

Patented Apr. 27, 1943

2,317,616

UNITED STATES PATENT OFFICE 2,317,616

ROUTING MACHINE FIXTURE

Dedger Jones, Columbus, Ohio, assignor to Curtis-Wright Corporation, a corporation of Delaware Application January 26, 1942, Serial No. 428,269

6 Claims. (Cl. 90—13.2)

This invention relates to improvements in fixtures for machine tools and is more particularly concerned with accessories for profiling or routing machines.

Objects of the invention are: to provide a manually movable work-carrying table or plate which also carries means to control the final contour of work being cut; to provide a work holder of a size greater than that of the work pieces whereby the operator may grasp the holder rather than the work pieces to reduce hazards of operation; to provide a template support of such character that the template may remain fixed to the holder when work pieces are changed thereon; and to provide a routing machine work holder capable of use with work of widely different shapes and sizes.

Figure 2:
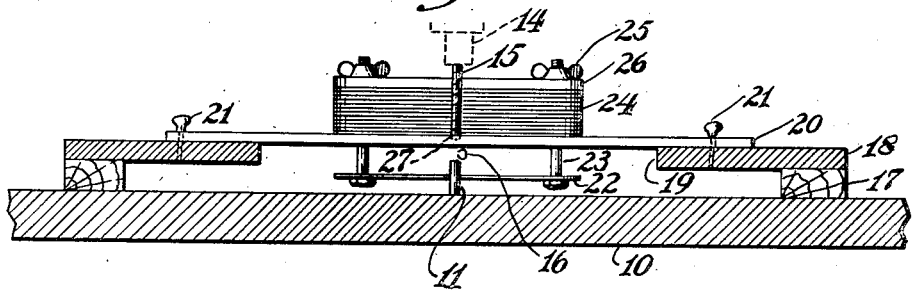

Further objects will become apparent in reading the detailed description below in connection with the drawing, in which:

Fig. 1 is a perspective view of a routing machine with the provisions of my invention, parts of which are broken away; and Fig. 2 is a section through the invention.

In the figures, 10 represents a routing machine work bed having a pilot pin 11 set therein. A yoke 12 above and rigid with the bed carries a router motor 13 in whose chuck 14 a cutter 15 is secured. The cutter 15 and the pin 11 are coaxial, are preferably of the same diameter, and are spaced between their ends as at 16. A spacer frame 17 rests upon the bed, and a flat plate 18 is secured thereto, the plate having a fairly large central opening 19. Resting on the plate 18, and disposed over the opening 19, is a table 20, either freely movable over or detachably secured to the assembly 17—18 as by pins 21, the table passing between the lower end of the cutter 15 and the upper end of the pin 11. A template 22, having its periphery conformed to the profile of a finished work piece, is secured to and below the table 20 by bolts 23, so that the edge of the template may contact the pin 11 intermediate its height by table manipulation. The template is clear of the bed 10 so that it cannot pick up chips or cuttings to interfere with free movement of it or the table. To the top of the table, one or more work pieces are secured, a stack of work pieces 24 being shown. Securement may be accomplished by clamps around the work pieces, or by nuts 25, as shown, engaging extensions of the bolts 23 which pass through predrilled holes in the work pieces. The latter are located directly above the template 22. After starting the router motor 13, the operator may guide the table 20 with the assembly 17, 18 so that the cutter engages the work pieces, at the same time keeping his hands far enough from the cutter and work pieces to minimize the hazard of injury. As the cutting progresses, the template 22 will engage the pilot pin 11 to limit the depth of cut.

The interposition of the table 20 between the cutter and pilot pin provides a semi-permanent support for the template 22 and also provides a large movable base for support of the work pieces allowing of faster and safer fabrication of parts. Upon completion of one set of work pieces, they may be removed from the table 20 and a new set of blanks installed without the usual extra operation of template alinement. Further, other templates of different size or shape may easily be substituted, using the same assembly 17, 18, and if desired, the same table 20. In stacking work pieces of sheet metal, a top plate 26 is clamped over the work so that the top work piece is prevented from bending or burring. Also the cutter 15 is set low enough as shown at 27, to cut into the table 20 a slight amount, assuring a true edge on the bottom work piece.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. In a routing machine having coaxial cutter and pilot pin members spaced between their ends and a flat bed from which one member projects, a work table movable over the bed, means to support the table in spaced relation to the bed to pass between said members, a template secured to one side of said table for engagement with the pilot member, and means to secure a work piece to the other side of said table directly opposite said template for engagement with said cutter member.

2. In a routing mahine having coaxial cutter and pilot pin members spaced between their ends and a flat bed from which one member projects, a work table movable over the bed, means to support the table in spaced relation to the bed to pass between said members, a template secured to one side of said table for engagement with the pilot member, and means to secure a work piece to the other side of said table directly opposite said template for engagement with said cutter member, said table being substantially larger than the template to enable an operator to manipulate the table without handling the work piece or approaching the cutter closely.

3. In a routing machine having coaxial cutter and pilot pin members spaced between their ends and a flat bed from which one member projects, a work table movable over the bed, means to support the table in spaced relation to the bed to pass between said members, a template secured to one side of said table for engagement with the pilot member, and means to secure a work piece to the other side of said table directly opposite said template for engagement with said cutter member, said template and work piece being secured to the table within the periphery of the template to allow of full profiling of the work piece without interruption.

4. In a routing machine having coaxial pilot pin and cutter members and a flat bed from which the pilot pin member projects, said members having a space between their ends, a table passing between the members, a template secured to the table in spaced relation thereto and lying between the table and bed for engagement with the pilot pin, means to secure a work piece to the opposite side of the table from the template, and directly above said template, the work piece being engageable with the cutter member, and means to support the table upon the bed in spaced relation thereto.

5. In a routing machine having coaxial pilot pin and cutter members and a flat bed from which the pilot pin member projects, said members having a space between their ends, a table passing between the members, a template secured to the table in spaced relation thereto and lying between the table and bed for engagement with the pilot pin, means to secure a work piece to the opposite side of the table from the template and directly above said template, the work piece being engageable with the cutter member, and means to support the table upon the bed in spaced relation thereto, said support means comprising a hollow frame having an auxiliary table thereon upon which said first table rests and over which said first table is freely movable.

6. In a routing machine having a flat bed, a pilot pin projecting upwardly therefrom and a cutter member spaced above and coaxial with the pilot pin, a hollow frame resting on said table having a central opening surrounding said pilot pin, a table resting on said frame bridging said opening and passing between the pilot pin and cutter ends, a template secured in spaced parallel relation to the under side of said table for engagement with said pilot pin, said template occupying a portion of the opening in said frame, and means for securing a stack of work pieces atop said table for engagement with said cutter, said work pieces being located directly above said template and being removable from said table without disturbing the relationship of the template relative to the table.

DEDGER JONES.